United States Patent
Xiao

(10) Patent No.: US 11,305,620 B2
(45) Date of Patent: Apr. 19, 2022

(54) SPECIAL LIFT WINDOW FOR RECREATIONAL VEHICLE

(71) Applicant: Jiangsu Sanjo Intelligent Technology Co., Ltd., Changzhou (CN)

(72) Inventor: Heping Xiao, Changzhou (CN)

(73) Assignee: JIANGSU SANJO INTELLIGENT TECHNOLOGY CO., LTD., Changzhou (CN)

( * ) Notice: Subject to any disclaimer, the term of this patent is extended or adjusted under 35 U.S.C. 154(b) by 103 days.

(21) Appl. No.: 16/755,716

(22) PCT Filed: Jan. 25, 2019

(86) PCT No.: PCT/CN2019/073068
§ 371 (c)(1),
(2) Date: Apr. 13, 2020

(87) PCT Pub. No.: WO2020/133622
PCT Pub. Date: Jul. 2, 2020

(65) Prior Publication Data
US 2021/0213808 A1    Jul. 15, 2021

(30) Foreign Application Priority Data
Dec. 29, 2018  (CN) .......................... 2018116399414

(51) Int. Cl.
| | |
|---|---|
| *E05F 11/48* | (2006.01) |
| *B60J 1/17* | (2006.01) |
| *B60P 3/36* | (2006.01) |
| *E05F 15/689* | (2015.01) |

(52) U.S. Cl.
CPC . *B60J 1/17* (2013.01); *B60P 3/36* (2013.01); *E05F 15/689* (2015.01)

(58) Field of Classification Search
CPC .... B60J 1/17; B60J 1/00; B60J 5/0487; B60P 3/36; B60P 3/32; E05F 15/689
USPC ............................................. 49/348, 349, 352
See application file for complete search history.

(56) References Cited

U.S. PATENT DOCUMENTS 1,771,229 A * 7/1930 Morton ..................... E05F 7/04
                                                    49/279
1,951,401 A * 3/1934 Farley .................. E05F 11/382
                                                    49/166
2,657,925 A * 11/1953 Crow ................... E05F 11/382
                                                    49/300

(Continued)

FOREIGN PATENT DOCUMENTS

CN       206360539 U      7/2017

*Primary Examiner* — Jerry E Redman
(74) *Attorney, Agent, or Firm* — AEON Law, PLLC; Adam L. K. Philipp; David V. H. Cohen

(57) ABSTRACT

The embodiment of the present invention discloses a special lift window for a recreational vehicle (RV), including a door-shaped frame installed on an RV wall; a damping groove for embedding a window body is provided on the door-shaped frame; the door-shaped frame is divided into a window display area and a window concealment area from up to down; a lifter bracket for fixing a window body lifter is disposed in the window concealment area; the window body lifter drives the window body to move reciprocally between the window display area and the window concealment area; and a distance between the lifter bracket and the door-shaped frame is not smaller than a maximum thickness of the window body lifter.

12 Claims, 4 Drawing Sheets

(56) References Cited

U.S. PATENT DOCUMENTS

| | | | | |
|---|---|---|---|---|
| 2,797,127 | A * | 6/1957 | Renno | B60J 5/0402 49/502 |
| 3,024,837 | A * | 3/1962 | McPhail | E06B 5/003 160/91 |
| 3,028,157 | A * | 4/1962 | Batley | E05F 11/486 49/352 |
| 3,444,649 | A * | 5/1969 | Rivolier | E05F 11/485 49/352 |
| 4,094,099 | A * | 6/1978 | Birch | B60J 1/2011 160/96 |
| 4,353,185 | A * | 10/1982 | Saigne | E05F 11/405 49/349 |
| 4,648,208 | A * | 3/1987 | Baldamus | B60J 5/0416 49/502 |
| 4,651,470 | A * | 3/1987 | Imura | B60J 5/0411 296/146.6 |
| 4,924,630 | A * | 5/1990 | Lomasney | B60J 5/0416 296/146.3 |
| 5,469,668 | A * | 11/1995 | Heim | B60J 5/0402 49/349 |
| 5,782,038 | A * | 7/1998 | Sponable | E05F 11/486 49/349 |
| 5,964,063 | A * | 10/1999 | Hisano | B60J 1/17 49/352 |
| 6,009,932 | A * | 1/2000 | Smith | E05B 7/00 160/180 |
| 6,170,199 | B1 * | 1/2001 | Stenzel | B60J 5/0416 49/352 |
| 6,354,652 | B1 * | 3/2002 | Arquevaux | E05F 11/488 296/146.1 |
| 6,397,524 | B1 * | 6/2002 | Sakaguchi | B60J 1/17 49/375 |
| 6,640,500 | B1 * | 11/2003 | Stout | B60J 5/0416 296/146.7 |
| 6,910,730 | B2 * | 6/2005 | Kinoshita | B60J 1/1861 296/146.16 |
| 7,448,668 | B2 * | 11/2008 | Brabeck | B60P 3/36 160/180 |
| 8,727,420 | B2 * | 5/2014 | Yasuhara | B60J 5/0431 296/146.6 |
| 2003/0070768 | A1 * | 4/2003 | Lewis, Jr. | E06B 7/2301 160/92 |
| 2006/0202506 | A1 * | 9/2006 | Brabeck | B60P 3/36 296/146.1 |
| 2007/0221340 | A1 * | 9/2007 | Aaron | B60J 5/0487 160/89 |
| 2009/0160220 | A1 * | 6/2009 | Elijah | B60J 5/0487 296/201 |
| 2010/0058666 | A1 * | 3/2010 | Kim | B60J 5/0487 49/28 |
| 2012/0204589 | A1 * | 8/2012 | Krellner | B60J 5/0487 62/239 |
| 2018/0100349 | A1 * | 4/2018 | Anderson | E06B 7/32 |
| 2019/0001796 | A1 * | 1/2019 | Kobatake | B60J 5/06 |

* cited by examiner

SPECIAL LIFT WINDOW FOR RECREATIONAL VEHICLE

FIELD OF TECHNOLOGY

The present invention relates to the technical field of lift windows, and in particular to a special lift window for a recreational vehicle (RV).

BACKGROUND

A locomotive lift window of a conventional structure has the following defects:

1. Due to the limitation of a shape, the assembly of an existing sedan lift window on an RV is not matched and has an uncoordinated sensory feeling.
2. The existing sedan lift window is assembled in a hinge manner or a push-and-pull manner, and cannot be assembled on the RV.
3. The existing sedan lift window has a large thickness and is thicker than an RV wall, so that the existing sedan lift window cannot be assembled on the RV.
4. A drainage system of the existing sedan lift window cannot meet a drainage requirement of an RV lift window.

SUMMARY

An objective of the embodiment of the present invention is to provide a special lift window for an RV, to solve a problem that an existing vehicle-mounted lift window cannot be installed on the RV.

To achieve the above-mentioned objective, the embodiment of the present invention provides the following technical solutions:

A special lift window for an RV includes a door-shaped frame installed on an RV wall; a damping groove for embedding a window body is provided inside the door-shaped frame; the door-shaped frame is divided into a window display area and a window concealment area from up to down; a lifter bracket for fixing a window body lifter is disposed in the window concealment area; the window body lifter drives the window body to move reciprocally between the window display area and the window concealment area; and a distance between the lifter bracket and the door-shaped frame is not smaller than a maximum thickness of the window body lifter.

As another preferable embodiment, the door-shaped frame is composed of at least three first sectional bars by splicing, and the damping groove is provided inside the first sectional bar.

As another preferable embodiment, a convex edge fixedly connected to the RV wall is provided on the first sectional bar.

As another preferable embodiment, a second sectional bar is disposed outside the door-shaped frame and between the window display area and the window concealment area.

As another preferable embodiment, a decorative frame is disposed inside the door-shaped frame and around an edge of the window display area, the decorative frame is composed of a third sectional bar by surrounding, and an outside of the third sectional bar is a decorative surface.

As another preferable embodiment, a connected body fixedly connected to the first sectional bar is disposed inside the third sectional bar.

As another preferable embodiment, a tooth surface is provided on the connected body, and a tooth line on the tooth surface is perpendicular to an inserted direction of the connected body.

As another preferable embodiment, a tooth trench is provided inside the third sectional bar, the tooth trench is of a groove shape and is provided with opposite tooth surfaces on two sides, and teeth on the tooth surfaces of the two sides are staggered.

As another preferable embodiment, a heat preservation cavity is provided in the third sectional bar.

As another preferable embodiment, a fourth sectional bar fixedly connected to the third sectional bar is disposed on the door-shaped frame, and the fourth sectional bar is disposed between the window display area and the window concealment area.

As another preferable embodiment, the lifter bracket includes a lift rod bracket and a lift motor bracket; the lift rod bracket includes an upper fixing frame for fixing an upper portion of a lift rod, a lower fixing frame for fixing a bottom of the lift rod, and a first spacing cushion block for setting a distance between the lift rod bracket and the door-shaped frame; a height of the first spacing cushion block is not smaller a thickness of the lift rod; the lift motor bracket includes a motor fixing frame for fixing a lift motor, and a second spacing cushion block for setting a distance between the motor fixing frame and the door-shaped frame; and a height of the second spacing cushion block is not smaller than a thickness of the lift motor.

As another preferable embodiment, both the upper fixing frame and the lower fixing frame are beams horizontally disposed on the door-shaped frame.

As another preferable embodiment, an auxiliary beam is disposed between the upper fixing frame and the lower fixing frame, and the auxiliary beam is fixedly connected to the motor fixing frame.

As another preferable embodiment, a reinforcing beam is disposed on the motor fixing frame, and the reinforcing beam is fixedly connected to the upper fixing frame and/or the lower fixing frame.

The embodiment of the present invention has the following advantages:

The special lift window for the RV provided by the embodiment of the present invention includes a door-shaped frame installed on an RV wall; a lifter bracket for fixing a window body lifter is disposed in a window concealment area of the door-shaped frame; the window body lifter drives the window body to move reciprocally between a window display area and the window concealment area; and a distance between the lifter bracket and the door-shaped frame is not smaller than a maximum thickness of the window body lifter. An inside of the lift window may be implemented as a planar structure, and the occupation of an internal space of the RV may be prevented.

The special lift window for the RV provided by the embodiment of the present invention may be detached as a whole, and has the beneficial effect of simple and convenient assembly; and the lift window has the planar structure inside, and is integrated with the RV wall after assembly, so that the internal space of the RV is not occupied, the appearance is coordinated and no feeling of strangeness exists. Moreover, a main frame of the lift window is made of an aluminum sectional bar, so the weight reduction effect is significant, and the strength meets an authentication requirement sufficiently. As lift glass is made of a polymethyl methacrylate (PMMA) material, and spliced by three layers, the lift glass is different from tempered glass of a conventional sedan and has the significant weight reduction effect.

Figure 1:
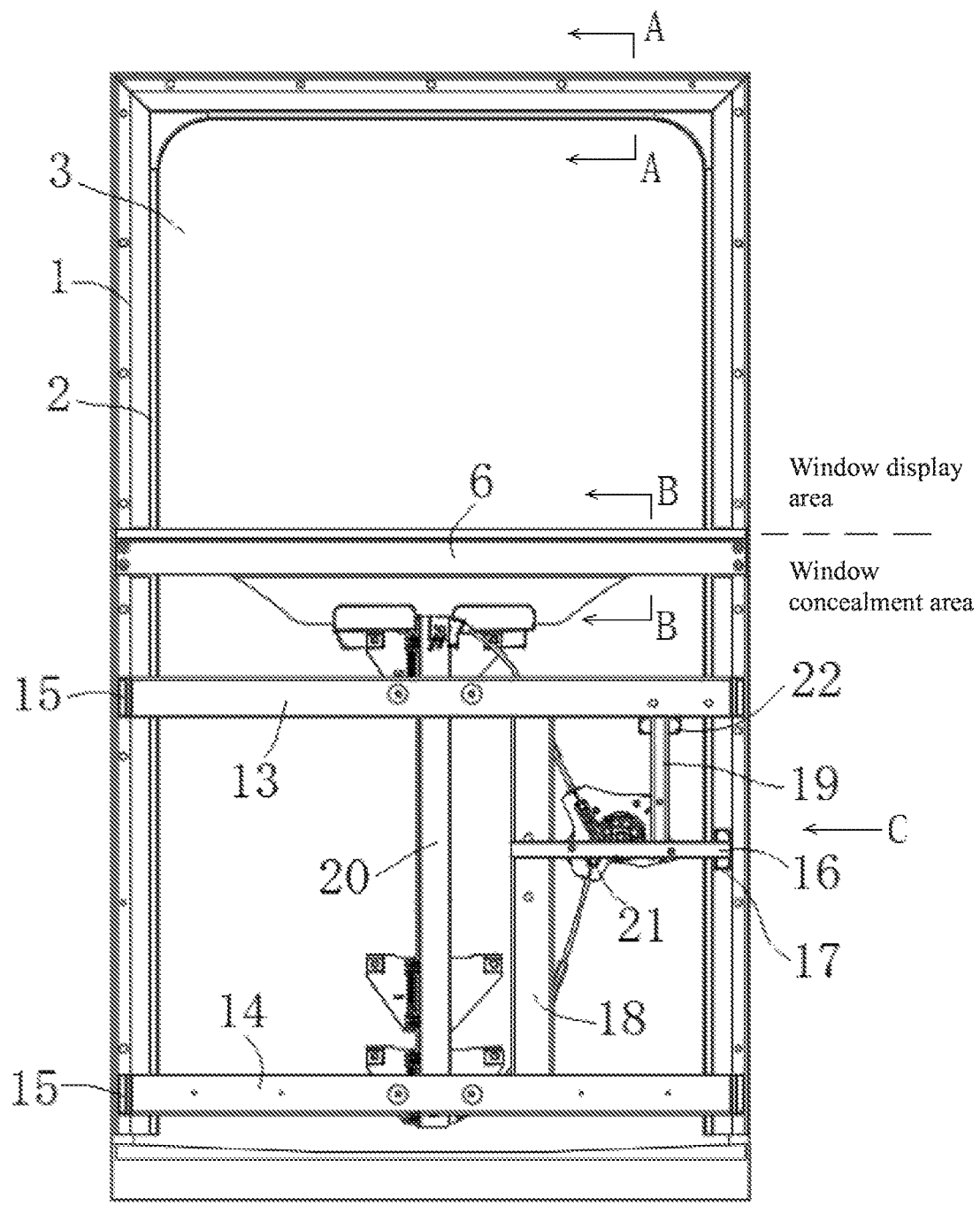
FIG. 1 is an overall structural diagram of a special lift window for an RV provided by Embodiment 1 of the present invention.

1. first sectional bar; 2. damping groove; 3. window body; 4. convex edge; 5. RV wall; 6. second sectional bar; 7. third sectional bar; 8. connected body; 9. tooth surface; 10. tooth trench; 11. heat preservation cavity; 12. fourth sectional bar; 13. upper fixing frame; 14. lower fixing frame; 15. first spacing cushion block; 16. motor fixing frame; 17. second spacing cushion block; 18. auxiliary beam; 19. reinforcing beam; 20. lift rod; 21. lift motor; and 22. third spacing cushion block.

DESCRIPTION OF THE EMBODIMENTS

Implementations of the present invention are described below with reference to particular specific embodiments, and a person skilled in the art can easily learn other advantages and effects of the present invention based on the content disclosed in this specification.

It is to be noted that the structures, proportions, sizes, etc., as shown in the drawings of this specification are only provided for cooperating with the contents disclosed in the present specification for those skilled in the art to understand and read, and are not intended to limit the limited conditions for implementing the present invention. Therefore, the structures, proportions, sizes, etc., as shown in the drawings are not technically significant. Any modification of the structure, change of the proportional relationship, or adjustment of the size without affecting the efficacy and the attainable purpose of the present invention should fall within the scope of the technical contents disclosed by the present invention. Meanwhile, the terms such as "upper", "lower", "left", "right", "intermediate", and the like are used in this specification only for the convenience of description, instead of limiting the scope of implementation of the present invention. Changes or adjustments made to the relative relationship, without substantive changes in the technical content, should be considered as being in the scope in which the present invention can be implemented.

As shown in FIG. 1, a special lift window for an RV includes a door-shaped frame installed on an RV wall 5; a damping groove 2 is provided inside the door-shaped frame; the door-shaped frame is divided into a window display area and a window concealment area from up to down; a lifter bracket for fixing a window body lifter is disposed in the window concealment area; the window body lifter drives a window body 3 to move reciprocally between the window display area and the window concealment area; and a distance between the lifter bracket and the door-shaped frame is not smaller than a maximum thickness of the window body 3 lifter. During specific use, the window display area is exposed outside; a metal plate is respectively disposed inside and outside the window concealment area, to conceal an internal structure; and the window body lifter drives the window body 3 to rise to the window display area to close a vehicle window, or drives the window body 3 to decline to the window concealment area to open the vehicle window. The distance between the lifter bracket and the door-shaped frame is adjusted according to structures of different vehicles, and is used for making the window body lifter and the window body 3 within a same horizontal plane. Hence, it is necessary to provide a space for accommodating the window body lifter between the lifter bracket and the door-shaped frame.

A specific technical solution of each part in the above-mentioned technical solutions will be described below in detail according to the embodiments:

1. Door-Shaped Frame

Figure 2:
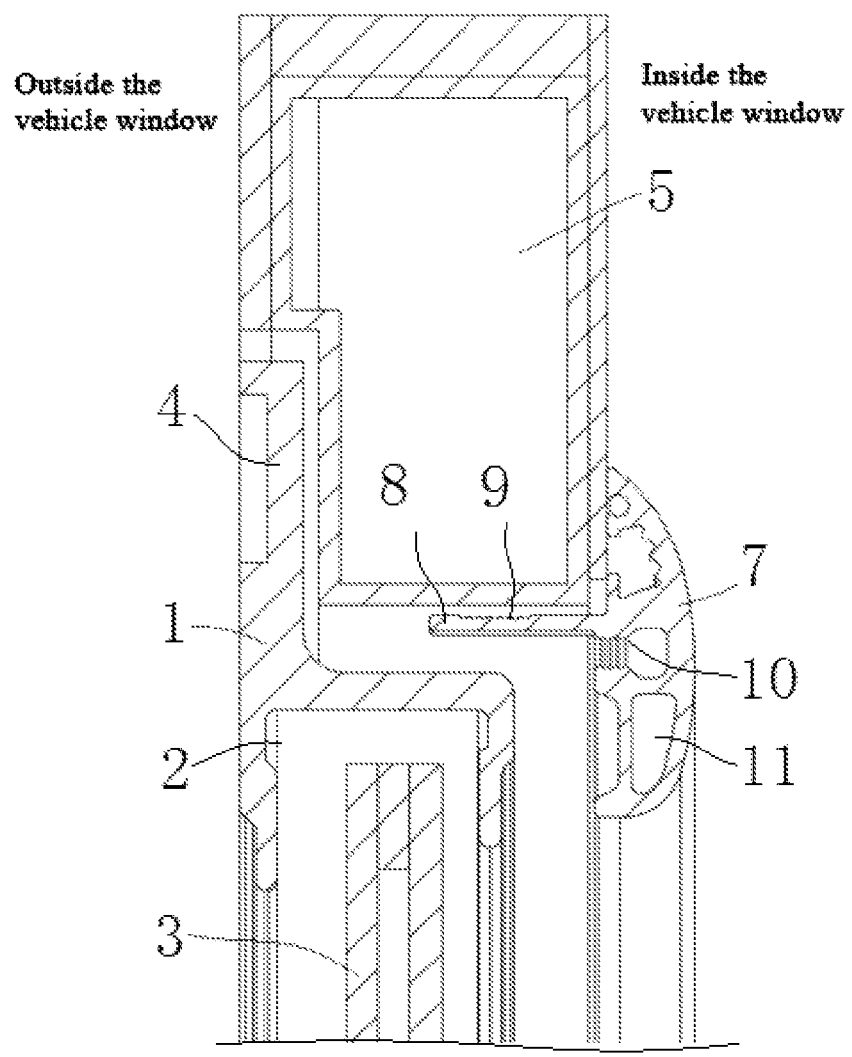
FIG. 2 is a sectional structural view on an A-A direction in FIG. 1.

As shown in FIG. 2, the door-shaped frame is composed of at least three first sectional bars 1 by splicing. The first sectional bar 1 is a strip-shaped sectional bar. Three first sectional bars 1 form a door-shaped structure, and four first sectional bars 1 form a rectangular structure. The damping groove 2 is provided inside the first sectional bar 1, and configured to limit an up-and-down movement of the window body 3. In order to meet requirements of convenience in installation and aesthetics, a convex edge 4 fixedly connected to the RV wall 5 is provided outside the first sectional bar 1. The convex edge 4 is located outside the first sectional bar 1. The convex edge 4 and the RV wall 5 are fixedly connected via a super glue or a fastener. Moreover, the convex edge 4 and the first sectional bar 1 are located in a perpendicular state in this embodiment, which may take the effect of limited installation with the RV wall and is convenient for machining and installation. By increasing a connection surface with the RV wall 5, the fastness therebetween may be increased. The convex edge 4 may conceal a connection gap between the first sectional bar 1 and the RV wall 5 to increase the aesthetics.

A second sectional bar 6 is disposed outside the door-shaped frame and located between the window display area and the window concealment area. A clamping inner belt is disposed on a top of the second sectional bar 6. The second sectional bar 6 is configured to increase the aesthetics between a bottom of the window display area and the RV wall 5, install the belt, and block the gap between the window body and the second sectional bar. In this embodiment, the second sectional bar 6 is of a strip shape, and is horizontally disposed on the door-shaped frame, with two ends fixedly connected to the door-shaped frame.

2. Decorative Frame

Figure 3:
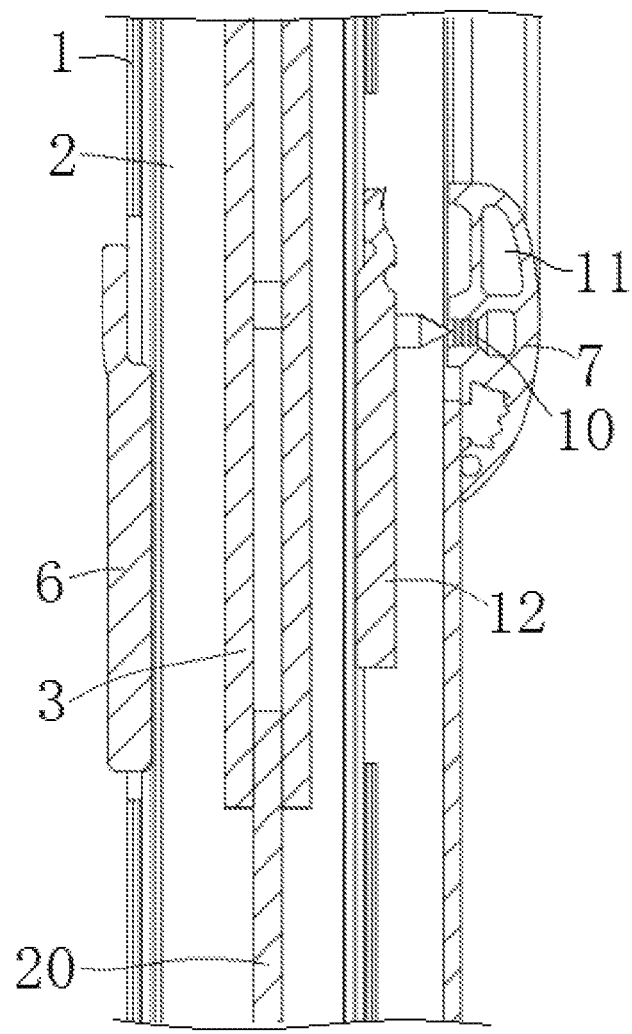
FIG. 3 is a sectional structural view on a B-B direction in FIG. 1.

As shown in FIGS. 2-3, a decorative frame is disposed inside the door-shaped frame and around an edge of the window display area, the decorative frame is composed of a third sectional bar 7 by surrounding, and an inside of the third sectional bar 7 may be fixedly connected to the door-shaped frame, or fixedly connected to the RV wall 5. In this embodiment, the third sectional bar 7 is fixedly connected to the RV wall 5; a cavity is provided between the third sectional bar 7 and the first sectional bar 1, and configured to increase thermal insulation therebetween (as shown in FIG. 2); an outside of the third sectional bar 7 is a decorative surface; and the decorative surface is of a streamline shape, may be an arc surface or a plane, is configured to increase the fastness between the door-shaped frame and the RV wall 5 and block the connection gap therebetween to take heat insulation and preservation effects, and may further increase the aesthetics at a connected place.

A connected body 8 fixedly connected to the first sectional bar 1 is disposed inside the third sectional bar 7. The connected body 8 is of a protruding structure, which may lower the connection difficulty between the third sectional bar 7 and the door-shaped frame. In this embodiment, the connected body 8 is a platy projection perpendicular to the third sectional bar 7; and moreover, in order to increase a frictional force between the connected body 8 and the RV wall 5, a tooth surface 9 may be provided on a connection surface of the connected body 8, and a tooth line on the tooth surface 9 is perpendicular to an inserted direction of the connected body 8.

A tooth trench 10 is provided inside the third sectional bar 7, the tooth trench 10 is of a groove shape and is provided with opposite tooth surfaces 9 on two sides, and teeth on the tooth surfaces 9 of the two sides are staggered. The tooth trench 10 is configured to be in meshed connection with a fastening bolt. The tooth trench 10 is of the groove shape and may be unnecessary to define a connected position, thereby lowering the construction difficulty, and being particularly applied to the connection of the bottom of the window display area.

A heat preservation cavity 11 is disposed in the third sectional bar 7, and configured to increase heat preservation and insulation properties of the third sectional bar 7 and implement a function of the third sectional bar 7 to block the connection gap.

A fourth sectional bar 12 fixedly connected to the third sectional bar 7 is disposed on the door-shaped frame, the fourth sectional bar 12 is disposed between the window display area and the window concealment area, and the clamping inner belt is disposed on a top of the fourth sectional bar 12 to install the belt. In this embodiment, the fourth sectional bar 12 is a beam horizontally disposed on the door-shaped frame; multiple uniformly-distributed connection holes are provided on the fourth sectional bar 12; and the fastening bolt is in meshed connection with the tooth trench 10 of the third sectional bar 7 through the connection hole, so that the third sectional bar 7 is fixed on the fourth sectional bar 12.

3. Lifter Bracket

Figure 4:
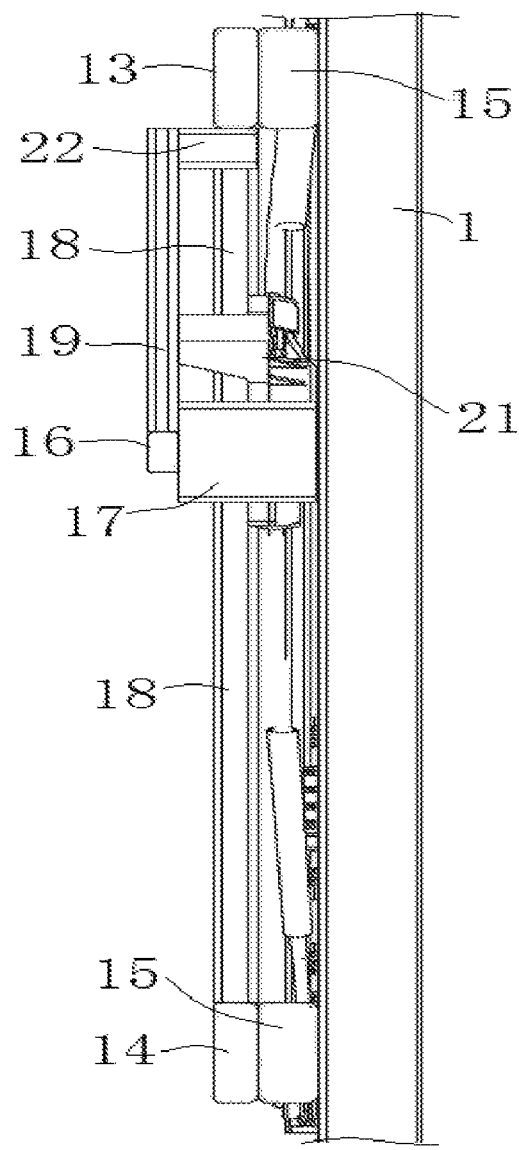
FIG. 4 is a view on a C direction in FIG. 1.

As shown in FIG. 1 and FIG. 4, the lifter bracket includes a bracket of a lift rod 20 and a bracket of a lift motor 21. A vehicle window lifter in the Chinese Patent Application No. CN 201621212575.0, entitled "LIFTER FOR VEHICLE WINDOW GLASS, VEHICLE DOOR AND VEHICLE", is used as an example in combination with the below contents to specifically describe the bracket of the lift rod 20 and the bracket of the lift motor 21 in this embodiment. The bracket of the lift rod 20 includes an upper fixing frame 13 for fixing an upper portion of the bracket of the lift rod 20, a lower fixing frame 14 for fixing a bottom of the bracket of the lift rod 20, and a first spacing cushion block 15 for setting a distance between the bracket of the lift rod 20 and the door-shaped frame; and a height of the first spacing cushion block 15 is not smaller a thickness of the bracket of the lift rod 20. In this embodiment, both the upper fixing frame 13 and the lower fixing frame 14 are beams horizontally disposed on the door-shaped frame; the upper fixing frame 13 is configured to fix the upper portion of the bracket of the lift rod 20; and the lower fixing frame 14 is configured to fix the bottom of the bracket of the lift rod 20. By means of connection of two fixing points, the bracket of the lift rod 20 is fixed on the door-shaped frame. In order to make a distance between the upper fixing frame 13 and the lower fixing frame 14 shortest, both the upper fixing frame 13 and the lower fixing frame 14 are perpendicular to the door-shaped frame.

The height of the first spacing cushion block 15 is determined by the thickness of the lift rod 20, so that the lift rod 20 is located at a center of the window body 3. The upper fixing frame 13 and the lower fixing frame 14 are respectively provided with the first spacing cushion block 15 at a connected place of the door-shaped frame. A length of the first spacing cushion block 15 at each place is different, and is determined in terms of a requirement on a height of a specific structure, with the purpose of making the upper fixing frame 13 and the lower fixing frame 14 within a same plane parallel to the door-shaped frame.

The lift motor 21 bracket includes a motor fixing frame 16 for fixing a lift motor 21, and a second spacing cushion block 17 for setting a distance between the motor fixing frame 16 and the door-shaped frame; and a height of the second spacing cushion block 17 is not smaller than a thickness of the lift motor 21.

An auxiliary beam 18 is disposed between the upper fixing frame 13 and the lower fixing frame 14; the auxiliary beam 18 is fixedly connected to the motor fixing frame 16; the auxiliary beam 18 is configured to shorten a length of the motor fixing frame 16, so that the motor fixing frame 16 does not need to traverse the whole door-shaped frame; the auxiliary beam 18 is disposed on one side of the lift motor 21; two ends of the motor fixing frame 16 are respectively connected to the auxiliary beam 18 and the motor fixing frame 16, to implement fixation of the lift motor 21, thus reducing the structural complexity; and the auxiliary beam 18 is detached easily, to facilitate the maintenance of the lift motor 21.

A reinforcing beam 19 is disposed on the motor fixing frame 16 in a crossed manner; the reinforcing beam 19 is fixedly connected to the upper fixing frame 13 and/or the lower fixing frame 14; and a third spacing cushion block 22 is disposed at a connected place of the reinforcing beam 19, and configured to adjust a height of the reinforcing beam 19, so that the reinforcing beam 19 and the motor fixing frame 16 are located at a same plane height. The reinforcing beam 19 is fixedly connected to the motor fixing frame 16. The lift motor 21 is connected by means of three points, so that the fastness between the lift motor 21 and the motor fixing frame 16 may be increased. According to a position of the lift motor 21, the reinforcing beam 19 may be disposed between the upper fixing frame 13 and the motor fixing frame 16 or disposed between the lower fixing frame 14 and the motor fixing frame 16, and fixedly connected to the motor fixing frame 16. In order to facilitate the installation and location, it is preferable that the reinforcing beam 19 is perpendicularly connected to the motor fixing frame 16.

Although the present invention has been described above in detail with general descriptions and specific embodiments, some modifications or improvements may be made based upon the present invention, which is apparent to the person skilled in the art. Therefore, these modifications or improvements made without departing from the spirit of the present invention pertain to a scope of protection of the present invention.

What is claimed is:

1. A lift window for a recreational vehicle (RV), comprising: a door-shaped frame installed on an RV wall, wherein a damping groove for embedding a window body is provided on the door-shaped frame; the door-shaped frame is divided into a window display area and a window concealment area from up to down; a lifter bracket for fixing a window body lifter is disposed in the window concealment area; the window body lifter drives the window body to move reciprocally between the window display area and the window concealment area; and a distance between the lifter bracket and the door-shaped frame is not smaller than a maximum thickness of the window body lifter;

wherein the lifter bracket comprises a bracket of a lift rod and a bracket of a lift motor;

the bracket of the lift rod comprises an upper fixing frame for fixing an upper portion of the lift rod, a lower fixing frame for fixing a bottom of the lift rod, and a first spacing cushion block for setting a distance between the bracket of the lift rod and the door-shaped frame; and a height of the first spacing cushion block is not smaller a thickness of the lift rod; and the bracket of the life motor comprises a motor fixing frame for fixing the lift motor, and a second spacing cushion block for setting a distance between the motor fixing frame and the door-shaped frame; and a height of the second spacing cushion block is not smaller than a thickness of the lift motor.

2. The lift window for the RV according to claim 1, wherein the door-shaped frame is composed of at least three first sectional bars by splicing, and the damping groove is provided on each of the first sectional bars.

3. The lift window for the RV according to claim 2, wherein a convex edge fixedly connected to the RV wall is provided on each of the first sectional bars.

4. The lift window for the RV according to claim 1, wherein a second sectional bar is disposed outside the door-shaped frame and between the window display area and the window concealment area.

5. The lift window for the RV according to claim 1, wherein a decorative frame is disposed inside the door-shaped frame and around an edge of the window display area, the decorative frame is composed of third sectional bars by surrounding, and an outside of the third sectional bars is a decorative surface.

6. The lift window for the RV according to claim 5, wherein a connected body fixedly, connected to each of the first sectional bars is disposed inside bars the third sectional bars.

7. The lift window for the RV according to claim 6, wherein a tooth surface is provided on the connected body, and a tooth line on the tooth surface is perpendicular to an inserted direction of the connected body.

8. The lift window for the RV according to claim 5, wherein a tooth trench is provided inside each of the third sectional bars, the tooth trench is of a groove shape and is provided with opposite tooth surfaces on two sides, and teeth on the tooth surfaces of the two sides are staggered.

9. The lift window for the RV according to claim 5, wherein a heat preservation cavity is provided in each of the third sectional bars.

10. The lift window for the RV according to claim 5, wherein a fourth sectional bar fixedly connected to each of the third sectional bars is disposed on the door-shaped frame, and the fourth sectional bar is disposed between the window display area and the window concealment area.

11. The lift window for the RV according to claim 1, wherein both the upper fixing frame and the lower fixing frame are beams horizontally disposed on the door-shaped frame.

12. The lift window for the RV according to claim 1, wherein an auxiliary beam is disposed between the upper fixing frame and the lower fixing frame, and the auxiliary beam is fixedly connected to the motor fixing frame; and a reinforcing beam is disposed on the motor fixing frame, and the reinforcing beam is fixedly connected to the upper fixing frame and/or the lower fixing frame.

* * * * *